(12) United States Patent
Tamaru

(10) Patent No.: US 6,880,901 B2
(45) Date of Patent: Apr. 19, 2005

(54) TRAVELING APPARATUS OF CRAWLER VEHICLE

(75) Inventor: Masatake Tamaru, Hirakata (JP)

(73) Assignee: Komatsu Ltd., Tokyo (JP)

( * ) Notice: Subject to any disclaimer, the term of this patent is extended or adjusted under 35 U.S.C. 154(b) by 33 days.

(21) Appl. No.: 10/655,895

(22) Filed: Sep. 4, 2003

(65) Prior Publication Data

US 2004/0056531 A1 Mar. 25, 2004

(30) Foreign Application Priority Data

Sep. 19, 2002 (JP) .................................... 2002-273891

(51) Int. Cl.$^7$ ................................................ B60S 1/62
(52) U.S. Cl. ...................... 305/109; 305/133; 305/125; 180/9.5
(58) Field of Search ................................. 305/109, 116, 305/15, 120, 135, 136, 125, 124, 227, 133, 132, 138, 139, 140; 180/9.5, 9.54, 9.52, 9.32, 193

(56) References Cited

U.S. PATENT DOCUMENTS

| | | | | |
|---|---|---|---|---|
| 3,871,462 A | * | 3/1975 | Krolak et al. .............. | 180/9.5 |
| 3,912,097 A | * | 10/1975 | Turner et al. .............. | 214/152 |
| 4,781,257 A | * | 11/1988 | Gee et al. .................. | 180/9.5 |
| 4,836,318 A | * | 6/1989 | Tonsor et al. .............. | 180/9.5 |

FOREIGN PATENT DOCUMENTS

| | | |
|---|---|---|
| JP | 57-107964 A | 7/1982 |
| JP | 2001-225770 A | 8/2001 |

* cited by examiner

Primary Examiner—Frantz F. Jules
(74) Attorney, Agent, or Firm—Frishauf, Holtz, Goodman & Chick, P.C.

(57) ABSTRACT

A traveling apparatus of a crawler vehicle can achieve both reduction of an impact applied to an operator cab and maintenance of high traction force even at a time of backward traveling on a ground surface having an irregularity. Right and left track frames (11, 11) are mounted to pivot shafts (31, 31) respectively mounted to right and left sides of a rear end portion of a main frame (30) so as to freely swing in a vertical direction, a rear frame (40) having a horizontal shaft apparatus (46) arranged therein is suspended to a rear portion of the main frame so as to freely swing in the vertical direction, final reduction gears (50) are attached to right and left outer sides of the rear frame, and an output shaft of the horizontal shaft apparatus is connected to an input shaft of the final reduction gear.

3 Claims, 11 Drawing Sheets

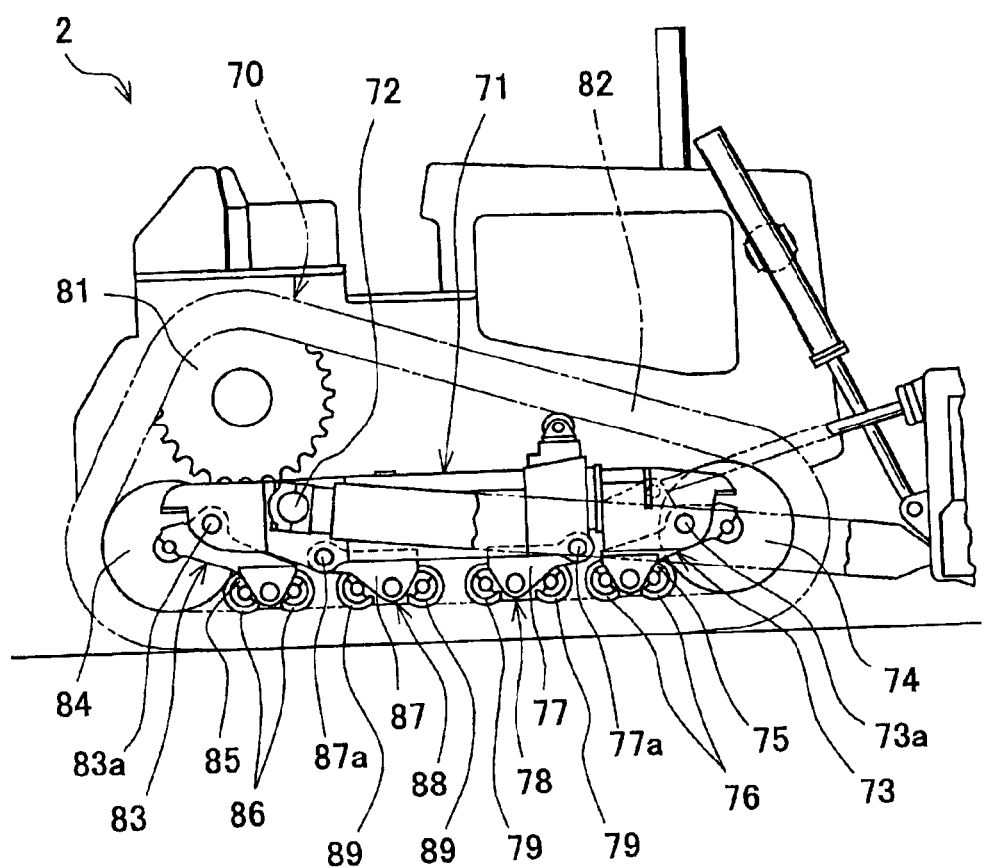
FIG.9
PriorArt

TRAVELING APPARATUS OF CRAWLER VEHICLE

FIELD OF THE INVENTION

The present invention relates to a traveling apparatus of a crawler vehicle, in particular, to a traveling apparatus of a crawler vehicle which travels on a ground surface having a great rolling plain or an irregularity such as rocks or the like.

BACKGROUND OF THE INVENTION

As is well known, the traveling apparatus of the crawler vehicle is required two functions of obtaining a great traction force and reducing a vibration and an impact of the vehicle, at a time of traveling the ground surface having the great rolling plain or the irregularity such as rocks or the like.

In particular, in the crawler vehicle such as a tractor, a bulldozer and the like working on the basis of the traction force, a traction force at a time when a crawler belt of the traveling apparatus slips due to a dozing load or a traction load (hereinafter, refer to as a shoe slip) is a critical traction force of the vehicle. Accordingly, the traveling apparatus of the vehicle is required to be structured such that the shoe slip can be inhibited from being generated as much as possible under a predetermined vehicle mass, whereby a high traction force can be obtained.

In order to solve the problem mentioned above, there has been conventionally considered various kinds of traveling apparatus of the crawler vehicle. As a first example, in Japanese patent document 1: Japanese Unexamined Patent Publication No. 57-107964, there is described a traveling apparatus of a crawler vehicle in which an improved road-hugging property of the traveling apparatus is secured at a time of traveling on the road surface having the great rolling or the irregularity such as the rocks or the like, and both of securing the traction force and cushioning the vibration and the impact of the vehicle are intended.

Further, as a second example, in Japanese patent document 2: Japanese Unexamined Patent Publication No. 2001-225770, there is described a traveling apparatus of a crawler vehicle in which a backward and forward stability is secured by bracing of front and rear end portions of the traveling apparatus against the dozing load or the traction load, thereby inhibiting the shoe slip from being generated and intending to secure a high traction force.

First, a description will be given of the first example of the traveling apparatus of the crawler vehicle in accordance with the conventional art by exemplifying the structure described in the publication 1, with reference to FIG. 9. FIG. 9 is a side elevational view of a bulldozer described in the publication 1.

In FIG. 9, a bulldozer 2 is provided with a pair of right and left traveling apparatuses 70 and 70. In each of the traveling apparatuses 70, a track frame 71 is swingably attached to a vehicle body via a pivot shaft 72. First arms 73 and 83 are respectively attached to both front and rear end portions of the track frame 71 by pins 73a and 83a so as to freely swing. Idlers 74 and 84 are rotatably attached to outer end portions of the first arms 73 and 83, respectively.

Approximately center portions of second arms 75 and 85 are swingably attached to inner lower end portions of the first arms 73 and 83, respectively. Track rollers 76 and 76 and track rollers 86 and 86 are rotatably attached to both end portions of the second arms 75 and 85, respectively.

On the other hand, base end portions of the first arms 77 and 87 are swingably attached to two positions in a center lower portion of the track frame 71 by pins 77a and 87a so as to be apart from each other in a back and forth direction, respectively. Approximately center portions of the second arms 78 and 88 are swingably attached to leading end portions of the first arms 77 and 87. Track rollers 79 and 79 and track rollers 89 and 89 are rotatably attached to both end portions of the second arms 78 and 88, respectively.

Further, a sprocket 81 is rotatably attached to the vehicle body above a rear end portion of the track frame 71, and a crawler belt 82 is wound around the sprocket 81, the idlers 74 and 84 and the track rollers 76, 79, 86 and 89.

In accordance with the structure shown in FIG. 9, the respective track frames 71 in the left and right traveling apparatuses 70 and 70 swing around the pivot shaft 72, whereby it is possible to secure a road-hugging property of the left and right traveling apparatuses 70 and 70 even at a time of traveling on the ground surface having a great rolling. Further, the idlers 74 and 84 and the track rollers 76, 79, 86 and 89 respectively swing, whereby it is possible to secure an improved road-hugging property of the traveling apparatus 70 even at a time of traveling on the ground surface having the irregularity such as the rocks or the like. As a result, it is possible to intend to secure the traction force and cushion the vibration and impact of the vehicle.

However, in the traveling apparatus 70 mentioned above, there is a problem that the shoe slip tends to be generated with respect to the great dozing load or the traction load. This will be in detail described with reference to FIG. 10. FIG. 10 is a view describing an example of the traction load of the bulldozer. In this case, the same reference numerals are attached to the same constituting elements as those shown in FIG. 9, and a description thereof will be omitted below.

In FIG. 10, in the case that a ripper apparatus 5 is attached to a rear portion of the bulldozer 2, and the rock is excavated by the ripper apparatus 5, it is hard to compress and destroy the rock as is well known. Therefore, the excavation is performed on the basis of a tension destruction by applying a force to the rock in a direction of an arrow D in the drawing toward a free space on the ground surface. As a result, an excavation reaction force R1 is going to lift up a front side of the bulldozer 2. However, the bulldozer 2 stands against the lift-up by a mass W and a supporting point reaction force R2. In this case, when the rear idler 84 of the traveling apparatus 70 swings upward at this time, the front portion of the traveling apparatus 70 tends to lift up, whereby the shoe slip tends to be generated. As a result, it is hard to increase a value of the traction force F to the maximum.

As a means for solving the problem mentioned above, the patent publication 2 mentioned above describes a traveling apparatus of a crawler vehicle in which a track frame, an idler and a sprocket are arranged approximately linearly. A description will be given of the second example in accordance with the conventional art by exemplifying the described structure. FIG. 11 is a side elevational view of the bulldozer described in the document 2, and FIG. 12 is a side elevational view of a traveling apparatus thereof. In this case, the same reference numerals are attached to the same constituting elements as those in FIG. 10, and a description thereof will be omitted below.

In FIGS. 11 and 12, traveling apparatuses 60 and 60 are arranged in left and right sides of the bulldozer 3. In each of the traveling apparatuses 60, a track frame 61, an idler 12 and a sprocket 63 are arranged approximately linearly. A plurality of track rollers 23, 24 and 25 are rotatably mounted to a lower portion of the track frame 61, and a crawler belt 14 is wound around the idler 12, the sprocket 63 and the track rollers 23, 24 and 25.

Further, the idler 12 is attached to the track frame 61 so as to be prevented from moving in a vertical direction, and the sprocket 63 is rotatably attached to a vehicle body frame (not shown). The track roller 25 positioned in a front side is rotatably attached to a leading end portion of an arm 26 which is swingably attached to the track frame 61 by a pin 26a. The track rollers 23 and 24 positioned sequentially positioned in a rear side of the track roller 25 are rotatably attached to both end portions of a second arm 22 which is swingably attached in an approximately center portion with respect to a leading end portion of a first arm 21 swingably attached to the track frame 61 by a pin 21a.

In accordance with the structure mentioned above, since the idler 12 and the sprocket 63 do not move in the vertical direction, the front portion or the rear portion of the traveling apparatus 60 is hard to lift up even in the case that a great dozing load or traction load is applied. Therefore, it is possible to inhibit the shoe slip from being generated and it is possible to obtain a high traction force.

However, in the traveling apparatus 60 disclosed in the publication 2, the following problems are generated. In other words, since the idler 12 and the sprocket 63 do not move in the vertical direction, the impact applied to an operator cab 4 is reduced by half by the swing motion (not shown) of the track frame 61 of the traveling apparatus 60 in the run-on side at a time of forward moving, for example, in the case that any one side of the right and left traveling apparatuses 60 runs on the rock during the traveling on the ground surface having the irregularity such as the rock or the like, however, the impact caused by the run-on of the sprocket 63 is directly transmitted to the operator cab 4 at a time of backward moving. As a result, since the impact applied to the operator cab 4 is great at a time of backward moving on the ground surface having the irregularity such as the rock or the like, there is a problem that a fatigue of an operator is increased and an operability within the operator cab 4 is lowered.

DISCLOSURE OF THE INVENTION

The present invention is made by taking the problems mentioned above into consideration, and an object of the present invention is to provide a traveling apparatus of a crawler vehicle which can achieve both reduction of an impact applied to an operator cab and maintenance of high traction force even at a time of backward traveling on a ground surface having an irregularity, in the traveling apparatus in which a track frame, an idler and a sprocket are arranged approximately linearly.

In accordance with a first aspect of the present invention, there is provided a traveling apparatus of a crawler vehicle having a main frame, each of right and left sides of the main frame comprises a tack frame, an idler, a sprocket to which a rotation power is transmitted from a side of the main frame, the track frame, the idler and the sprocket being arranged approximately linearly, a track roller rotatably provided in a lower portion of the tack frame, and a crawler belt wound around the idler, the track roller and the sprocket, wherein pivot shafts are respectively mounted to right and left sides of a rear end portion of the main frame, the right and left track frames are mounted to the pivot shafts so as to swing in a vertical direction, a rear frame having a horizontal shaft apparatus for supplying a power to the right and left sprockets arranged therein is suspended to a rear portion of the main frame so as to freely swing in the vertical direction, final reduction gears including sprockets are respectively attached to right and left outer sides of the rear frame, and an output shaft of the horizontal shaft apparatus is connected to an input shaft of the final reduction gear.

In accordance with the first aspect, the following operations and effects can be obtained.

(1) Since the final reduction gears including the sprockets are mounted to the rear frame which is suspended to the rear portion of the main frame so as to freely swing in the vertical direction, the impact applied in the case that the sprocket runs on the ground projection at a time of backward moving is transmitted to the main frame and the operator cab arranged in the upper portion of the main frame via the cushioning member in the suspension portion of the rear frame. Accordingly, it is possible to widely reduce a peak value of the impact transmitted to the operator cab.

(2) If a rear working machine such as a ripper apparatus or the like is mounted to the rear frame to which the final reduction gear including the sprocket is mounted, a mutual position between the rear working machine and the sprocket is fixed and no relative displacement is generated. Therefore, the sprocket can stand as a reaction force supporting point against a traction load applied by the rear working machine. Accordingly, it is possible to maintain a high traction force.

In accordance with a second aspect of the present invention, there is provided a traveling apparatus of a crawler vehicle as recited in the first aspect, wherein each of the right and left pivot shafts is constituted by a swing shaft portion mounting the track frame so as to freely swing vertically, and a swing shaft portion mounting the rear frame so as to freely swing vertically, and these swing shaft portions are integrally formed.

In accordance with the second aspect, the following operations and effects can be achieved.

(1) Since it is necessary to firmly attach the vertical swing shaft of the track frame and the vertical swing shaft of the rear frame to the main frame so as to stand against a great load, a large placing space is normally required for independently attaching them. However, in accordance with the present invention, both the vertical swing shafts are integrally structured. Accordingly, it is possible to widely save a space and simplify the structure.

(2) As a result, in the main frame of the traveling apparatus of the crawler vehicle in accordance with the prior art, it is possible to separate the portion at the rear of the pivot shaft in the main frame, and it is possible to easily employ a structure for suspending the separated rear frame to the pivot shaft so as to freely swing vertically. Therefore, the present invention can be significantly easily applied.

In accordance with a third aspect of the present invention, there is provided a traveling apparatus of a crawler vehicle as recited in the second aspect, wherein an axis of the swing shaft portion of the rear frame is eccentric with respect to an axis of the swing shaft portion of the track frame.

In accordance with the third aspect, it is possible to set the swing axis of the track frame and the swing axis of the rear frame to respective appropriate positions while keeping the effect of the second aspect. Accordingly, it is further easy to apply the present invention to various kinds of crawler vehicles.

BRIEF DESCRIPTION OF THE DRAWINGS

FIG. 9 is a side elevational view of a bulldozer to which a traveling apparatus in accordance with a first prior art is applied;

BEST MODE FOR CARRYING OUT THE INVENTION

A description will be in detail given below of embodiments of a traveling apparatus of a crawler vehicle in accordance with the present invention by exemplifying a bulldozer with reference to FIGS. 1 to 7.

First, a description will be given of a first embodiment with reference to FIGS. 1 to 6.

Figure 1:
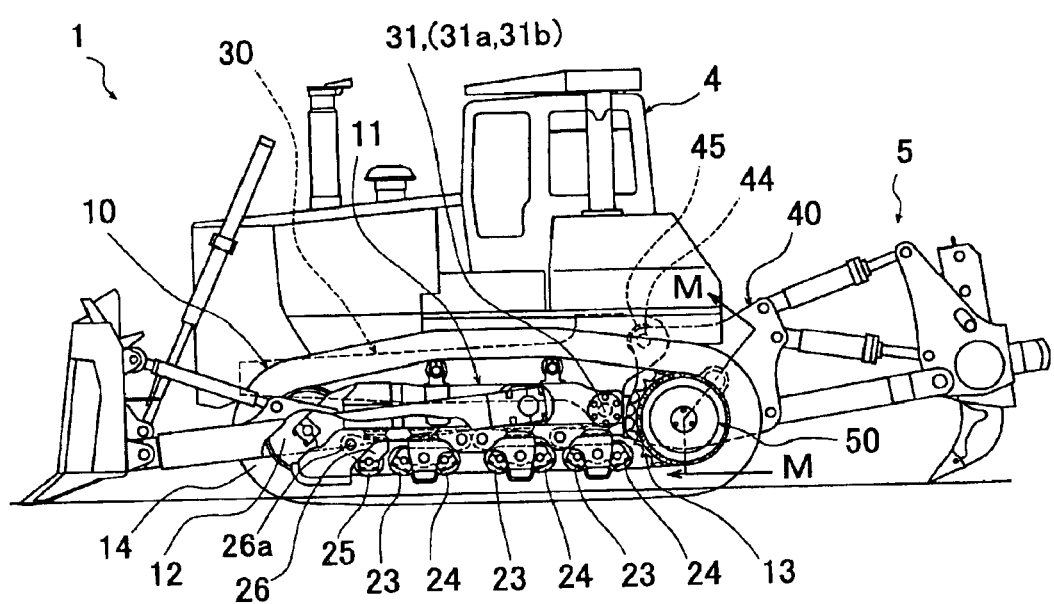
FIG. 1 is a side elevational view of a bulldozer to which a traveling apparatus in accordance with the present invention is applied.
Figure 2:
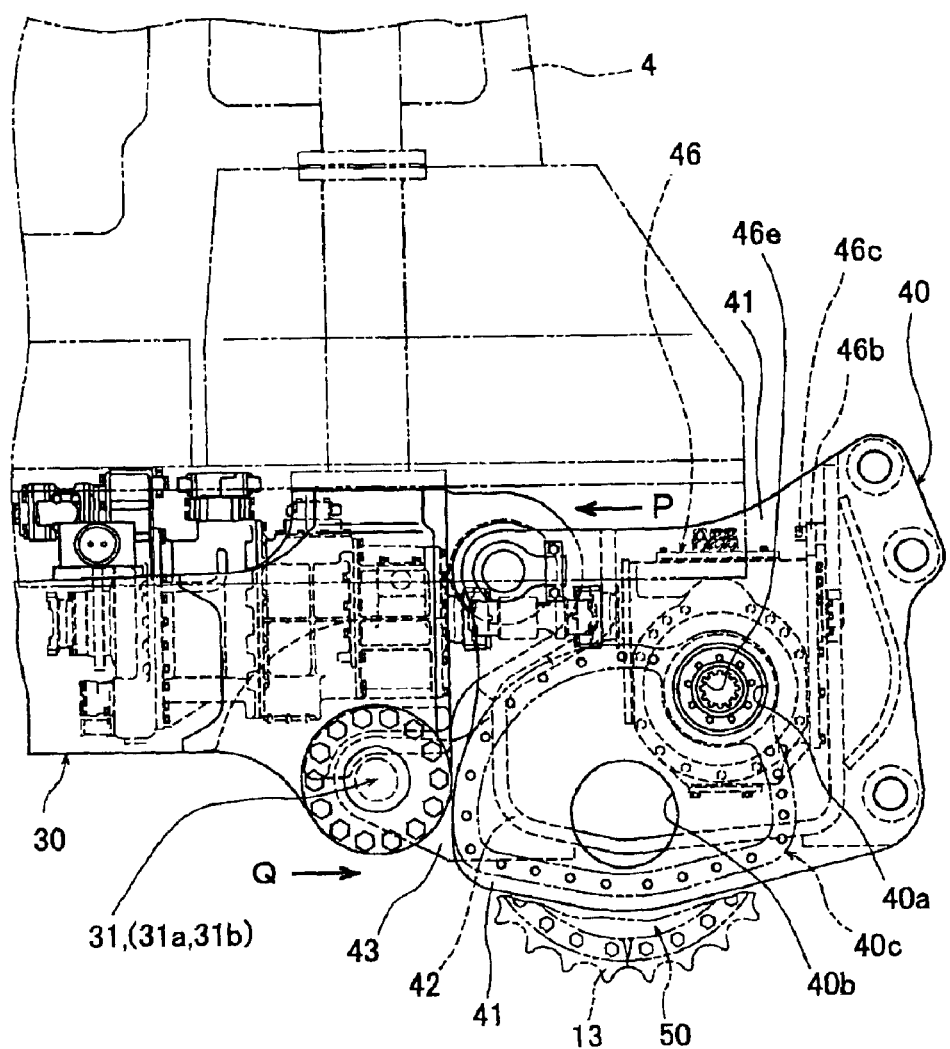
FIG. 2 is a side elevational view of a main portion of the traveling apparatus in accordance with the present invention.
Figure 3:
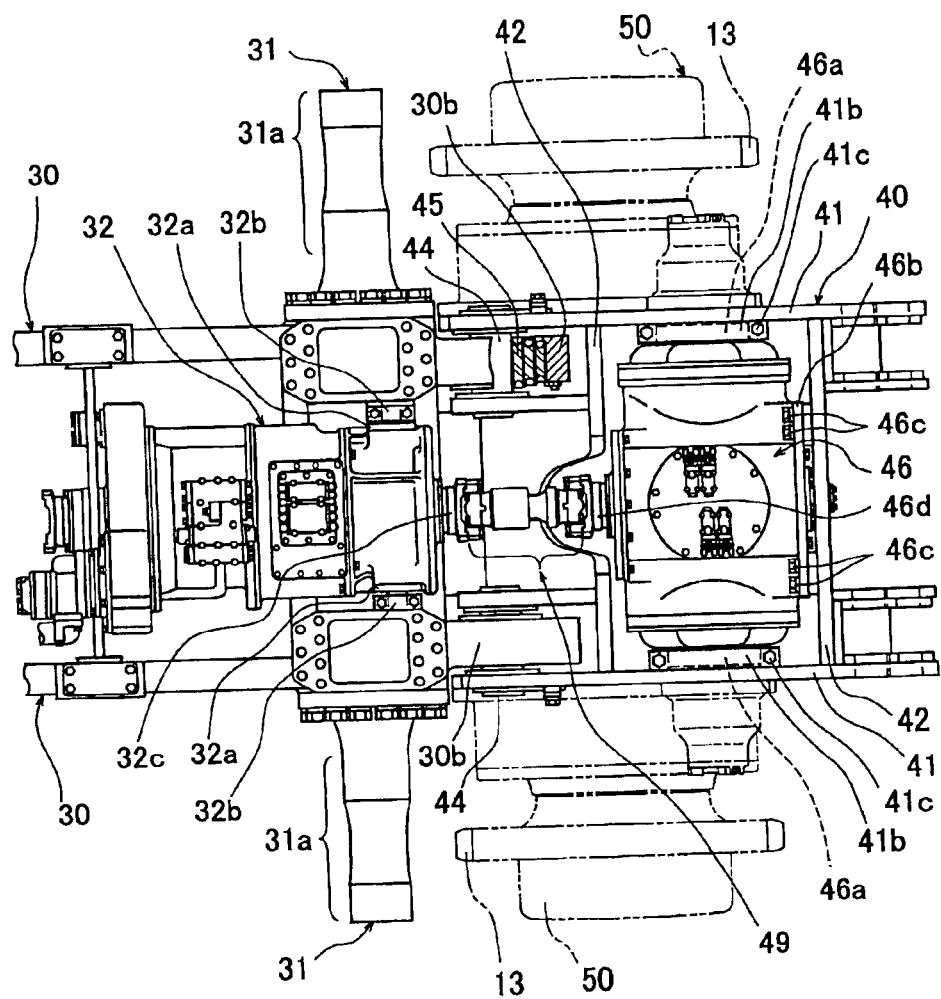
FIG. 3 is a top elevational view of the main portion of the traveling apparatus in accordance with the present invention.
Figure 4:
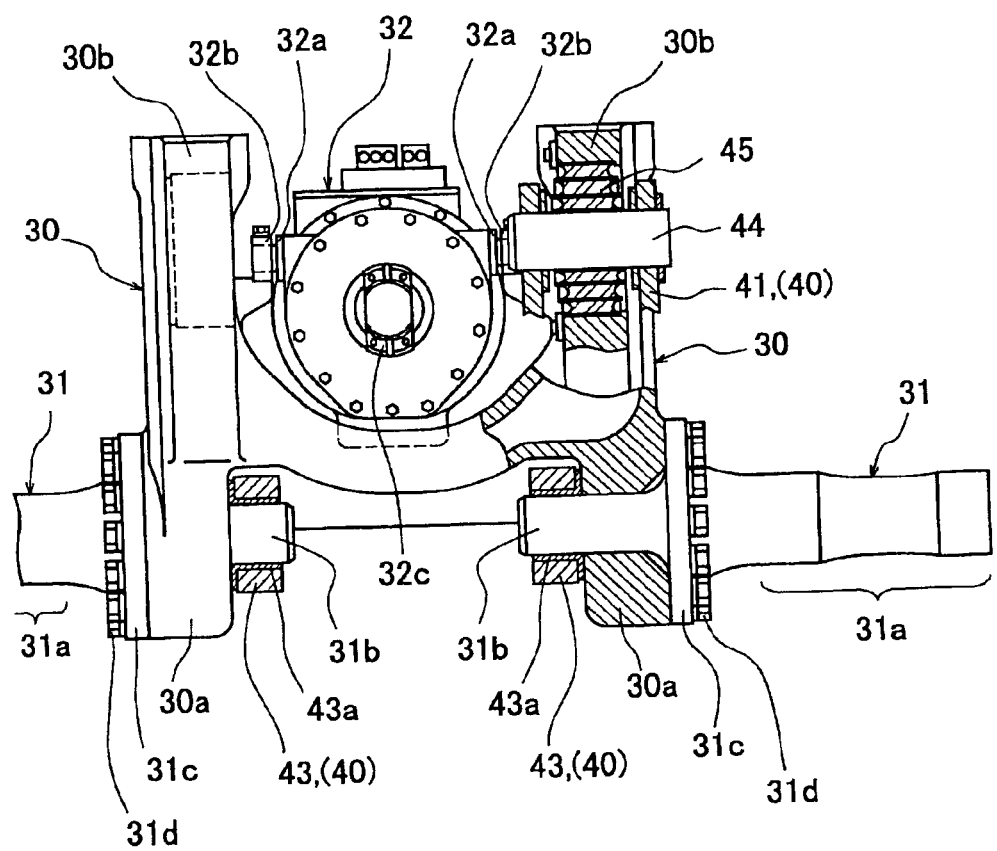
FIG. 4 is a partial cross sectional rear view of a main portion of a traveling apparatus in accordance with a first embodiment, and corresponds to a view as seen from an arrow P in FIG. 2.
Figure 5:
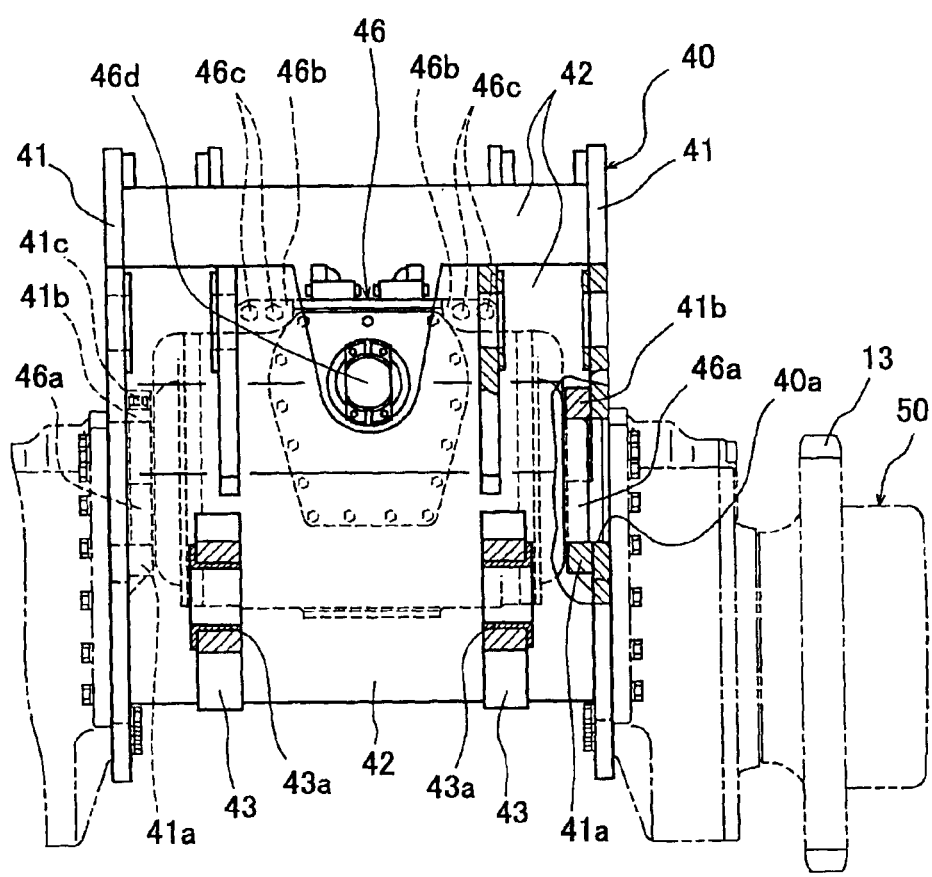
FIG. 5 is a partial cross sectional rear view of the main portion of the traveling apparatus in accordance with the first embodiment, and corresponds to a view as seen from an arrow Q in FIG. 2.
Figure 6:
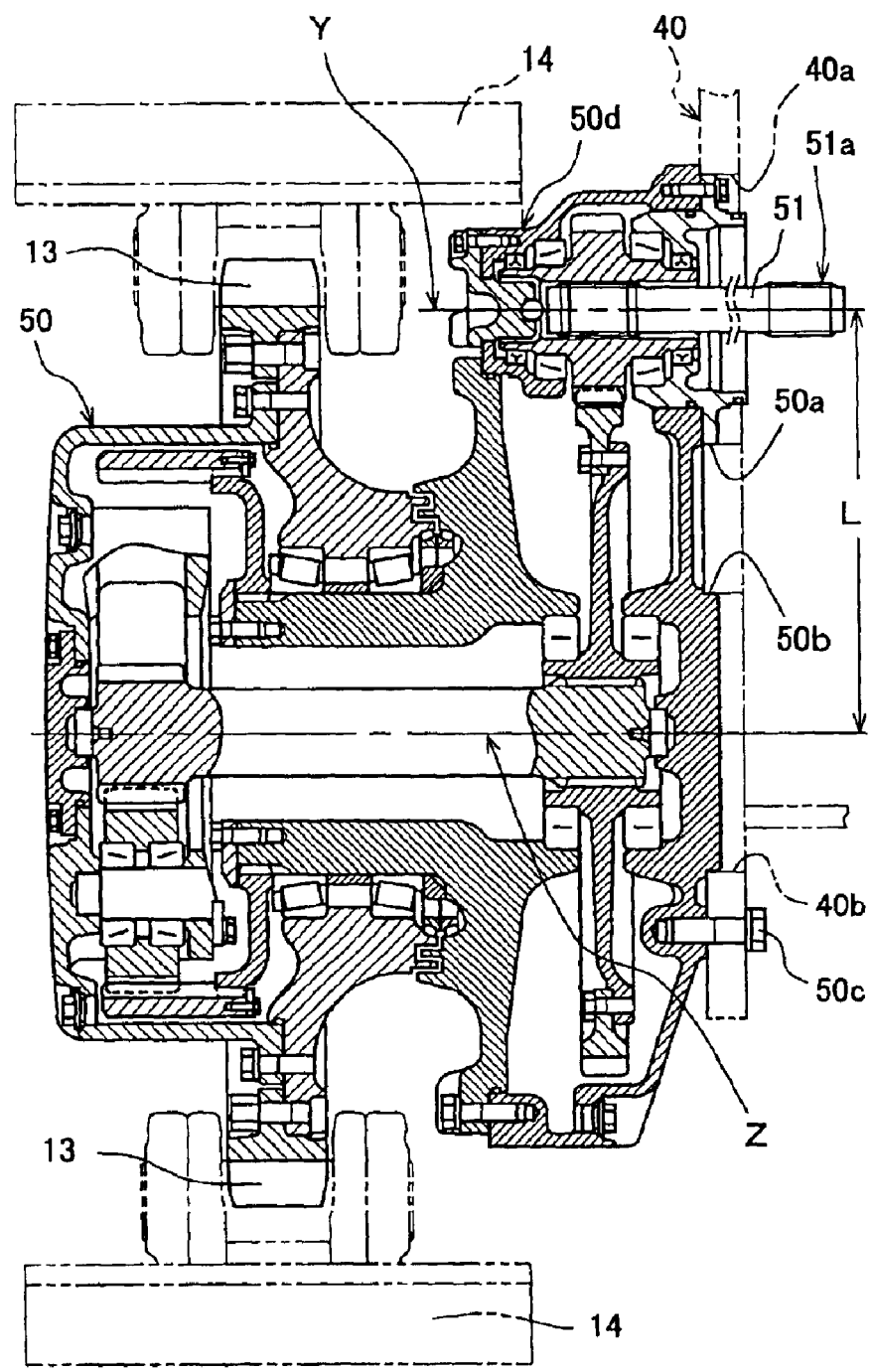
FIG. 6 is a cross sectional rear view of the main portion of the traveling apparatus in accordance with the first embodiment, and corresponds to a cross sectional view along a line M—M in FIG. 1.

FIG. 1 is a side elevational view of a bulldozer to which a traveling apparatus of a crawler vehicle in accordance with the present invention is applied, FIG. 2 is a side elevational view of a main portion of the traveling apparatus of the crawler vehicle in accordance with the present invention, FIG. 3 is a top elevational view of the main portion of the traveling apparatus, FIG. 4 is a partial cross sectional rear view of a main portion of a traveling apparatus in accordance with a first embodiment, and corresponds to a view as seen from an arrow P in FIG. 2, FIG. 5 is a partial cross sectional rear view of the main portion of the traveling apparatus, and corresponds to a view as seen from an arrow Q in FIG. 2, and FIG. 6 is a cross sectional rear view of the main portion of the traveling apparatus, and corresponds to a cross sectional view along a line M—M in FIG. 1. In this case, the same reference numerals are attached to the same constituting elements as those in FIGS. 9 to 12, and a description thereof will be omitted.

In FIG. 1, a pair of traveling apparatuses 10 and 10 are arranged in right and left sides of a bulldozer 1. Each of the traveling apparatuses 10 is structured such that a track frame 11, an idler 12 and a sprocket 13 are arranged approximately linearly, track roller 23, 24 and 25 are rotatably mounted to a lower portion of the track frame 11, and a crawler band 14 is wound around the idler 12, the sprocket 13 and the track rollers 23, 24 and 25.

Pivot shafts 31 are provided in right and left lower portions in a rear end portion of the main frame 30 so as to protrude to outer sides in a lateral direction, and right and left track frames 11 and 11 are respectively mounted to the right and left pivot shafts 31 and 31 so as to freely swing vertically. Further, a rear frame 40 is suspended to a rear portion of the main frame 30 so as to freely swing vertically (details will be described later), and a final reduction gear 50 including the sprocket 13 is attached to right and left sides of the rear frame 40. Further, a rear working machine such as a ripper apparatus 5 or the like is attached to the rear frame 40.

In FIGS. 2 to 5, flange portions 31c of the pivot shafts 31 and 31 are detachably mounted to outer surfaces of right and left lower portions 30a and 30a in a rear end portion of the main frame 30 by bolts 31d, respectively. Swing shaft portions 31b in inner end portions of the pivot shafts 31 are protruded inward so as to pass through the right and left lower portions 30a and 30a in the rear end portion of the main frame 30. Further, boss portions 30b and 30b for suspending the rear frame 40 are arranged in the right and left upper portions in the rear end portion of the main frame 30.

The rear frame 40 is structured by firmly fixing a cross member 42 having an approximately U-shaped cross section in a side view to a portion between a pair of right and left side plates 41 and 41, bosses 43 and 43 are provided in right and left sides in a front surface lower portion of the cross member 42 so as to protrude forward, and the right and left bosses 43 and 43 are rotatably inserted to swing shaft portions 31b and 31b in inner sides of the right and left pivot shafts 31 and 31 via bearing bushes 43a and 43a, respectively. Further, front end upper portions of the right and left side plates 41 and 41 in the rear frame 40 are rotatably connected to the boss portions 30b and 30b in the right and left upper portions of the rear end portion of the main frame 30 by a pair of right and left pins 44 and 44 and a pair of damping rubber bushes 45 and 45 inserted to outer peripheries of the pins 44 and 44, respectively. In accordance with the structure mentioned above, the rear frame 40 is suspended to the rear portion of the main frame 30 so as to freely swing vertically.

A horizontal shaft apparatus 46 for supplying a power to the right and left final reduction gears 50, the horizontal shaft apparatus being well known in the bulldozer, is arranged in an inner portion of the rear frame 40. Right and left cylinder portions 46a and 46a of a casing in the horizontal shaft apparatus 46 are supported by half bosses 41a and 41a which are attached to inner surfaces of the right and left side plates 41 and 41 in the rear frame 40 and are worked together with holes 40a and 40a of the right and left side plates 41 and 41, half caps 41b and 41b are fitted to the half bosses 41a and 41a from upper sides thereof, and both elements are fastened by bolts 41c. Further, rear end upper portions 46b of the horizontal shaft apparatus 46 are fastened to the cross member 42 by bolts 46c, thereby preventing the horizontal shaft apparatus 46 from being rotated by a torque reaction force.

In this case, as shown in FIG. 3, an input shaft 46d of the horizontal shaft apparatus 46 is engaged with an output shaft 32c of a transmission 32 which is attached to the main frame 30 by trunnions 32a and 32a and caps 32b and 32b, by means of a joint allowing an eccentricity and an expansion and compression (called as an eccentricity and expansion and compression allowing joint) 49. Accordingly, it is possible to transmit the power from the transmission 32 to the horizontal shaft apparatus 46, even in the case that the rear frame 40 swings.

Further, as shown in FIG. 2, a seat surface 40c for mounting the final gear 50 including the sprocket 13, and holes 40a and 40b for defining a mounting position of the final gear 50 are arranged in each of the right and left side surfaces of the rear frame 40.

Next, in FIG. 6, the final reduction gear 50 having the sprocket 13 corresponding to an output shaft and an input shaft 51 is fastened to the rear frame 40 by a bolt 50c in a state in which two cylindrical projection portions 50a and 50b in an inner surface of a casing of the final reduction gear 50 are fitted and positioned to two holes 40a and 40b respectively formed in the right and left side plates 41 and 41 of the rear frame 40. Further, a leading end spline portion 51a of the input shaft 51 is engaged with a spline hole in an output shaft 46e of the horizontal shaft apparatus 46 shown in FIG. 2. In this case, in FIG. 6, there is shown the embodiment in which a planetary gear type reduction gear transmitting the power input from the input shaft 51 to the sprocket 13 is provided within the final reduction gear 50. However, the present invention is not limited to this, and the other reduction gears may be employed.

Further, a distance L between an input axis Y and an output axis Z is set so that the side surface protruding portion 50d of the final reduction gear 50 is not interfered with the crawler belt 14.

In the pivot shaft 31, a swing shaft portion 31a of the track frame 11 and a swing shaft portion 31b of the rear frame 40 are integrally structured, whereby it is possible to achieve a simplification of the structure and a wide saving of the placing space, and the present invention is easily achieved. In this case, as an example, the swing shaft portion 31b of the rear frame 40 is concentrically and integrally structured with the swing shaft portion 31a of the track frame 11, however, the structure may be made such that the swing shaft portion 31b is arranged as an independent member from the swing shaft portion 31a, and in this case, they may be made non-concentric.

Further, the joint 49 allowing the eccentricity and expansion and compression is exemplified in a graphic form by a general so-called propeller shaft in which the spline shaft is inserted to the sleeve with the spline hole and a star member is arranged in an outer end portion thereof. However, the structure is not limited to this, and the other concentricity and expansion and compression allowing joints may be employed.

Further, in addition to the horizontal shaft apparatus 46 of the type having a control of driving or stopping the right and left output shafts 46e and 46e by the clutch and the brake, the horizontal shaft apparatus 46 may be constituted by a so-called steering gear box in which the right and left output shafts can be forward rotated, stopped and reverse rotated by using a hydraulic type or using a hydraulic type and a mechanical type together.

Figure 7:
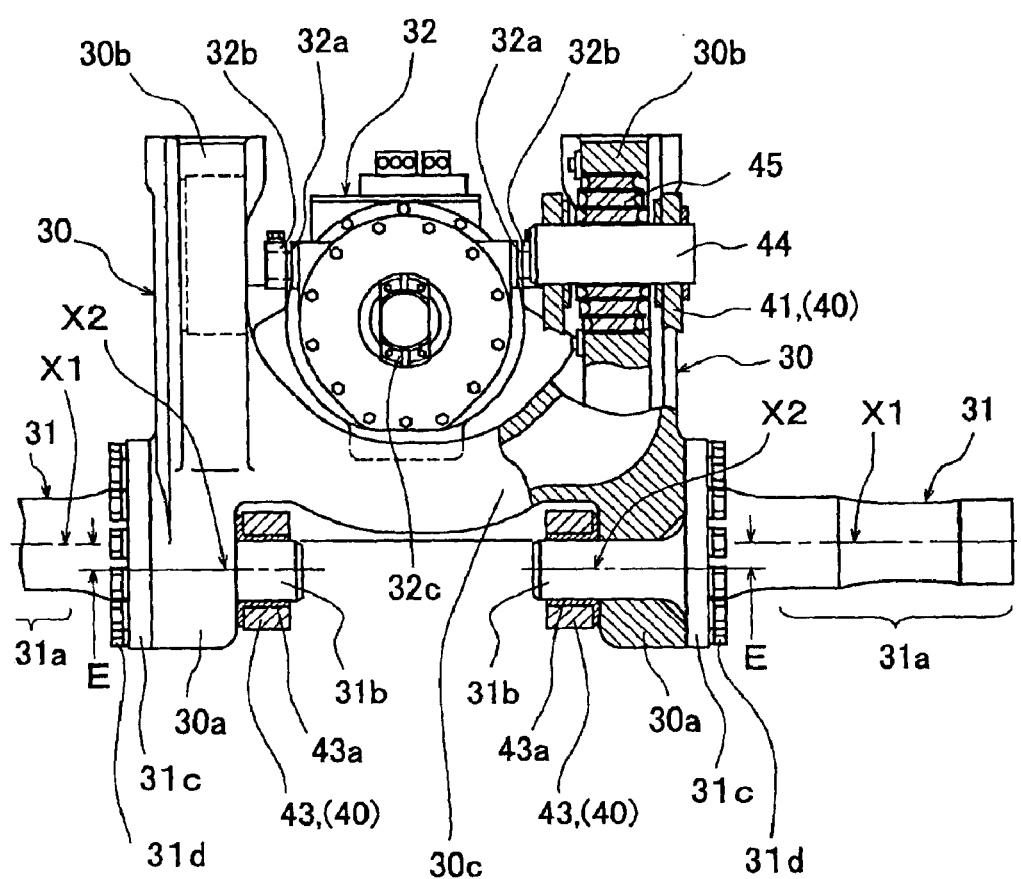
FIG. 7 is a partial cross sectional rear view of a main portion of a traveling apparatus in accordance with a second embodiment, and corresponds to a view as seen from an arrow P in FIG. 2.

Next, a description will be given of a second embodiment with reference to FIG. 7. FIG. 7 is a partial cross sectional rear view of a main portion of a traveling apparatus of a crawler vehicle in accordance with a second embodiment, and corresponds to a view as seen from an arrow P in FIG. 2. In this case, the same reference numerals are attached to the same constituting elements as those in FIGS. 9 to 12, and a description thereof will be omitted.

In FIG. 7, an axis X2 of the swing shat portion 31b arranged in the pivot shaft 31 is eccentrically arranged by a predetermined distance E to a lower side from an axis X1 of the swing shaft portion 31a arranged in the pivot shaft 31. Accordingly, upper spaces of the right and left swing shaft portions 31b and 31b are expanded, thereby making it easy to arrange the cross member 30c of the main frame 30. Therefore, the present invention is further easily achieved.

An impact transmitted to the operator cab 4 generated at a time when the sprocket 13 runs on the projection on the ground surface during the backward moving can be reduced by the structure in accordance with the first embodiment and the second embodiment shown in FIGS. 1 to 7. This will be in detail described below.

Figure 8A:
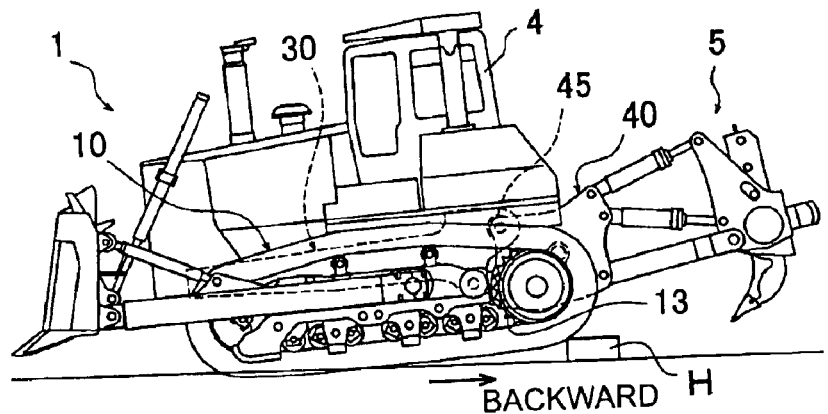
FIGS. 8A, 8B and 8C are explanatory views of operations and effects of the traveling apparatus in accordance with the present invention.
Figure 8B:
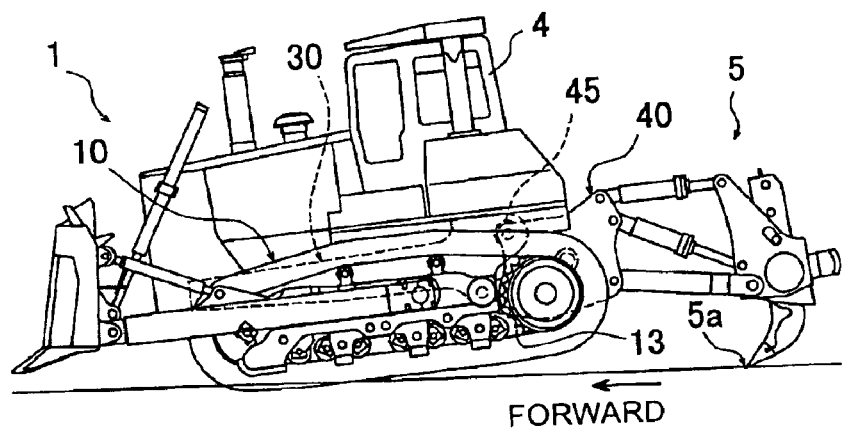
Figure 8C:
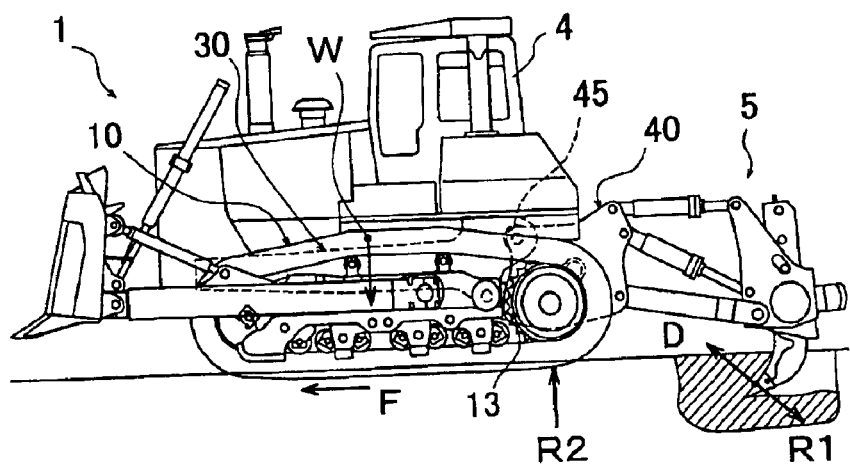
Figure 10:
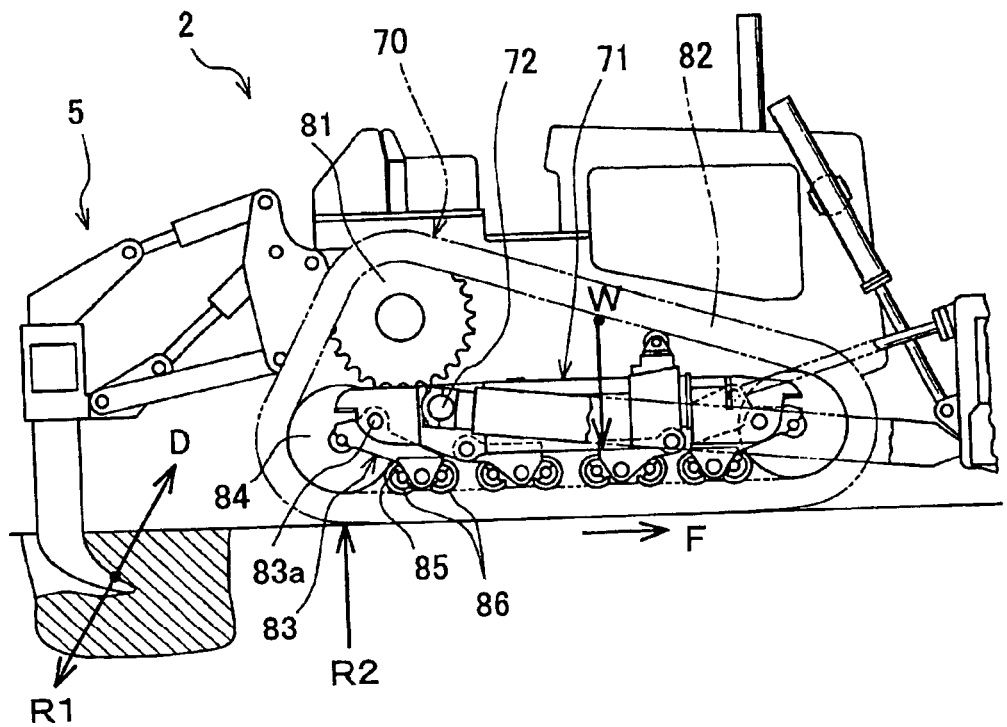
FIG. 10 is an explanatory view of one example of a traction load in the bulldozer.
Figure 11:
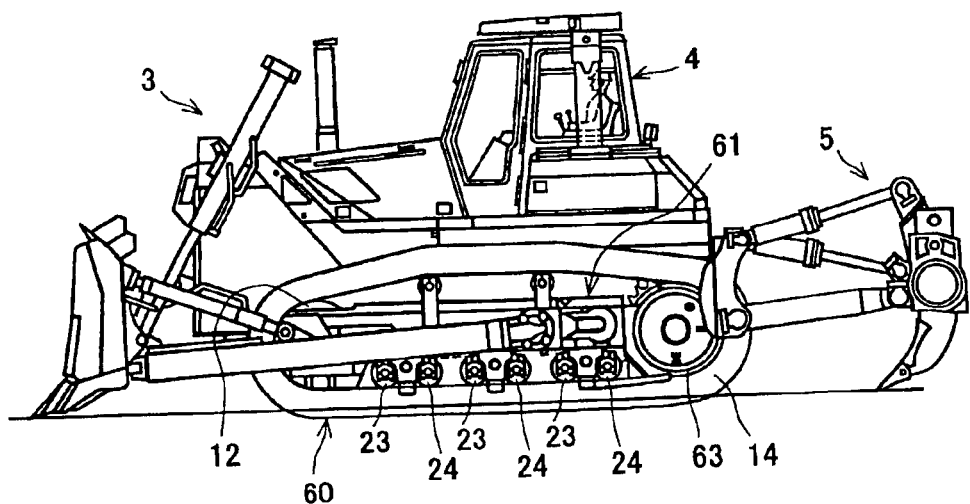
FIG. 11 is a side elevational view of a bulldozer to which a traveling apparatus in accordance with a second prior art is applied.
Figure 12:
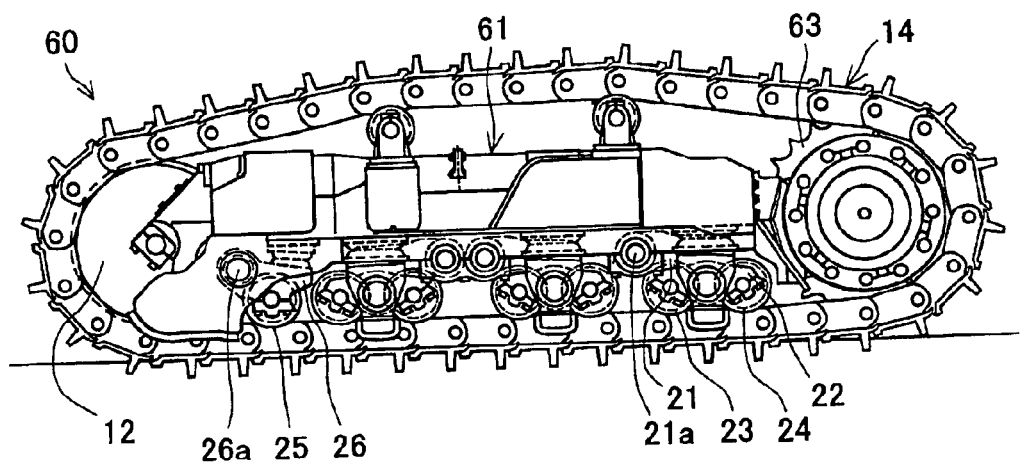
FIG. 12 is a side elevational view of the traveling apparatus in accordance with the second prior art.

FIGS. 8A, 8B and 8C are explanatory views of operations and effects of the traveling apparatus of the crawler vehicle in accordance with the present invention, in which FIG. 8A is a view of a state in which the bulldozer 1 moves backward and runs on the projection H on the ground surface, FIG. 8B is a view of a state in which the bulldozer 1 moves forward and starts an excavating work by using the ripper apparatus 5, and FIG. 8C is a view of a state in which the bulldozer 1 is under execution of the excavating work by means of the ripper apparatus 5. In this case, the same reference numerals are attached to the same constituting elements in the previous drawings, and a description thereof will be omitted.

First, in FIG. 8A, when the bulldozer 1 moves backward and runs on the projection H on the ground surface, the impact by which the sprocket 13 is thrown up is transmitted to the main frame 30 and the operator cab 4 arranged on the upper portion of the main frame via the damping rubber bush 45. At this time, since the rear frame 40 to which the sprocket 13 is mounted swings around the swing shaft portion 31b mentioned above, an amplitude of the swing of the main frame 30 is reduced in comparison with an amplitude of the sprocket 13. Accordingly, the peak value of the impact transmitted to the operator cab 4 is widely reduced, and the impact can be inhibited.

Next, in FIG. 8B, when the bulldozer 1 moves forward and starts the excavating work of the rock by using the ripper apparatus 5, the vibration generated by slipping of a ripper point 5a attached to a leading end of the ripper apparatus 5 on the rock surface having the irregularity until the ripper point 5a eats into a cleft in the rock is transmitted to the rear frame 40. Since the vibration is transmitted to the main frame 30 and the operator cab 4 arranged in the upper portion of the main frame via the damping rubber bush 45, the vibration transmitted to the operator cab 4 can be widely reduced.

Next, in FIG. 8C, while the bulldozer 1 executes the excavating work of the rock by means of the ripper apparatus 5, an excavating reaction force R1 is applied to the rear frame 40. However, since the final reduction gear 50 mentioned above including the sprocket 13 is attached to the rear frame 40, the sprocket 13 does not move upward, and the bulldozer 1 can stand against the excavating reaction force R1, so that a great traction force F can be obtained.

In this case, the rear working machine attached to the rear frame 40 is not limited to the ripper apparatus 5. Even in the case of the other rear working machines, the bulldozer 1 can stand against the excavating reaction force R1, and a great traction force can be maintained.

Further, in accordance with the present invention, the rear frame 40 is suspended to the rear portion of the main frame 30 so as to freely swing vertically, and the final reduction gears 50 and 50 are attached to the right and left outer sides thereof. Even in the structure mentioned above, the present invention can be easily applied by arranging the horizontal shaft apparatus 46 supplying the power to the well-known right and left final reduction gears 50 in the inner portion of the rear frame 40 and connecting the horizontal shaft apparatus 46 to the transmission 32 arranged on the main frame 30 by the eccentricity and expansion and compression allowing joint 49, without widely changing the transmission and the horizontal shaft apparatus in accordance with the prior art.

In this case, in the first and second embodiments, the damping rubber bush 45 is used as the damping apparatus, however, the damping apparatus is not limited to this. The same operations and effects can be obtained by the damping apparatus which uses the other rubber pads and/or springs.

Further, the first and second embodiments are described by exemplifying the bulldozer 1, however, the present invention is not limited to this. The present invention can be applied similarly to the traveling apparatus of the other crawler vehicles, and the same operations and effects can be obtained.

As described above, in accordance with the present invention, in the traveling apparatus of the crawler vehicle in which the track frame, the idler and the sprocket are arranged approximately linearly, the track roller is rotatably provided in the lower portion of the track frame, and the crawler band is wound around the idler, the track roller and the sprocket, it is possible to achieve both reduction of the impact applied to the operator cab and maintenance of high traction force even at a time of backward traveling on the ground surface having the irregularity.

What is claimed is:

1. A traveling apparatus of a crawler vehicle having a main frame, each of right and left sides of the main frame comprising:

a tack frame;

an idler;

a sprocket to which a rotation power is transmitted from a side of the main frame;

the track frame, the idler and the sprocket being arranged approximately linearly;

a track roller rotatably provided in a lower portion of the tack frame; and a crawler belt wound around the idler, the track roller and the sprocket, wherein pivot shafts are respectively mounted to right and left sides of a rear end portion of said main frame, said right and left track frames are mounted to the pivot shafts so as to swing in a vertical direction, a rear frame having a horizontal shaft apparatus for supplying a power to said right and left sprockets arranged therein is suspended to a rear portion of said main frame so as to freely swing in the vertical direction, final reduction gears including sprockets are respectively attached to right and left outer sides of the rear frame, and an output shaft of said horizontal shaft apparatus is connected to an input shaft of the final reduction gear.

2. A traveling apparatus of a crawler vehicle as claimed in claim 1, wherein each of said right and left pivot shafts is constituted by a swing shaft portion mounting said track frame so as to freely swing vertically, and a swing shaft portion mounting said rear frame so as to freely swing vertically, and these swing shaft portions are integrally formed.

3. A traveling apparatus of a crawler vehicle as claimed in claim 2, wherein an axis of the swing shaft portion of said rear frame is eccentric with respect to an axis of the swing shaft portion of said track frame.

* * * * *